US011027736B2

(12) United States Patent
Rajab et al.

(10) Patent No.: US 11,027,736 B2
(45) Date of Patent: Jun. 8, 2021

(54) SYSTEMS AND METHODS FOR ANTICIPATORY LANE CHANGE

(71) Applicants: Honda Motor Co., Ltd., Tokyo (JP); The Regents of the University of California, Oakland, CA (US)

(72) Inventors: Samer Rajab, Novi, MI (US); Xue Bai, Novi, MI (US); Guoyuan Wu, Rancho Cucamonga, CA (US); Kanok Boriboonsomsin, Portland, OR (US); Matthew J. Barth, Riverside, CA (US); Nigel Williams, Riverside, CA (US)

(73) Assignees: HONDA MOTOR CO., LTD., Tokyo (JP); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 250 days.

(21) Appl. No.: 15/965,345

(22) Filed: Apr. 27, 2018

(65) Prior Publication Data

US 2019/0329777 A1 Oct. 31, 2019

(51) Int. Cl.
*B60W 30/18* (2012.01)
*G06N 5/04* (2006.01)
(Continued)

(52) U.S. Cl.
CPC ...... *B60W 30/18163* (2013.01); *B60W 40/04* (2013.01); *B60W 50/0097* (2013.01);
(Continued)

(58) Field of Classification Search
CPC .......... B60W 30/18163; B60W 40/04; B60W 50/0097; B60W 2754/10; B60W 2556/65;
(Continued)

(56) References Cited

U.S. PATENT DOCUMENTS 9,616,924 B2 4/2017 Spero et al.
9,669,872 B2 6/2017 Rebhan et al.
(Continued)

FOREIGN PATENT DOCUMENTS

CN 105480229 4/2016
DE 102014200896 7/2015

*Primary Examiner* — Michael V Kerrigan
(74) *Attorney, Agent, or Firm* — Rankin, Hill & Clark LLP

(57) ABSTRACT

An anticipatory lane change system is described for assisting a host vehicle positioned in a current lane that is adjacent an adjacent lane. The anticipatory lane change system may include an identification module that identifies a potential lane change location and receives proximate vehicle data associated with proximate vehicles. The anticipatory lane change system may include a prediction module that predicts future kinematic data at a future time for a set of the proximate vehicles. The anticipatory lane change system may include a determination module that determines whether a gap will be available at the potential lane change location at the future time based on the future kinematic data. The anticipatory lane change system may include a lane change module that initiates a lane change maneuver for the host vehicle in response to determining that the gap will be available at the potential lane change location at the future time.

20 Claims, 11 Drawing Sheets

(51) Int. Cl.
 B60W 50/00 (2006.01)
 B60W 40/04 (2006.01)
 G08G 1/16 (2006.01)

(52) U.S. Cl.
 CPC ............... *G06N 5/04* (2013.01); *G08G 1/166* (2013.01); *G08G 1/167* (2013.01); *B60W 2050/0026* (2013.01); *B60W 2552/00* (2020.02); *B60W 2554/80* (2020.02); *B60W 2556/65* (2020.02); *B60W 2710/18* (2013.01); *B60W 2710/20* (2013.01); *B60W 2720/106* (2013.01); *B60W 2754/10* (2020.02)

(58) Field of Classification Search
 CPC ......... B60W 2554/80; B60W 2552/00; B60W 2050/0026; B60W 2720/106; B60W 2710/20; B60W 2710/18; B60W 2554/00; B60W 60/00276; B60W 60/00272; B60W 60/0027; G08G 1/166; G08G 1/167; G06N 5/04

See application file for complete search history.

(56) References Cited

U.S. PATENT DOCUMENTS

| | | | |
|---|---|---|---|
| 2005/0256630 A1* | 11/2005 | Nishira | ................. B60W 10/04 701/96 |
| 2014/0067206 A1* | 3/2014 | Pflug | ...................... G08G 1/163 701/41 |
| 2015/0194055 A1* | 7/2015 | Maass | .............. G08G 1/096716 340/905 |
| 2016/0229395 A1 | 8/2016 | Schmudderich | |
| 2017/0008531 A1 | 1/2017 | Watanabe | |
| 2017/0334446 A1 | 11/2017 | Bosch et al. | |
| 2018/0319403 A1* | 11/2018 | Buburuzan | ............ G08G 1/161 |

\* cited by examiner

SYSTEMS AND METHODS FOR ANTICIPATORY LANE CHANGE

BACKGROUND

Changing lanes is a stressful driving scenario and can cause traffic congestion and collisions. Lane changing occurs when a vehicle in one lane moves laterally into an adjacent lane of traffic. The driver of the lane changing vehicle must decide whether the lane change is possible based on the relative location and speed of the vehicles already in the adjacent lane. For example, a driver has to determine whether a gap in the traffic of the adjacent lane will be available by the time the vehicle moves to the adjacent lane.

This is further complicated in scenarios with downstream vehicles because the actions of the downstream vehicles may affect whether the gap is available. For example, should one of the downstream vehicles slow down, the gap may unexpectedly close. Accordingly, the driver of a lane changing vehicle must gauge the position and speed of the vehicles already in the adjacent lane and still may not be able to determine if a lane change will be possible. Likewise, a driver of a vehicle already in the adjacent lane can only guess the behavior of a downstream vehicle that is located a vehicle or two ahead of the mainline vehicle. Thus, changing lanes is stressful for the drivers of both the vehicle changing lanes and the vehicle already in the adjacent lane.

BRIEF DESCRIPTION

According to one aspect, an anticipatory lane change system is described for assisting a host vehicle positioned in a current lane that is changing to an adjacent lane. The anticipatory lane change system may include an identification module that identifies a potential lane change location and receives proximate vehicle data associated with proximate vehicles. The proximate vehicle data includes vehicle identifiers and current kinematic data. The anticipatory lane change system may also include a prediction module that predicts future kinematic data at a future time for a set of the proximate vehicles. The set of proximate vehicles may have at least three proximate vehicles. The anticipatory lane change system may further include a determination module that determines whether a gap will be available at the potential lane change location at the future time based on the future kinematic data. The anticipatory lane change system may also include a lane change module that initiates a lane change maneuver for the host vehicle in response to determining that the gap will be available at the potential lane change location at the future time.

According to another aspect, an anticipatory lane change system is described for assisting a host vehicle positioned in a current lane that is changing to an adjacent lane. The anticipatory lane change system may include an identification module that identifies a potential lane change location and receives proximate vehicle data associated with proximate vehicles. The proximate vehicle data includes vehicle identifiers and current kinematic data. The anticipatory lane change system may also include a prediction module that generates future kinematic data by iteratively calculating kinematic data for a set of the proximate vehicles at predictive increments until the predictive increment corresponds to a future time. When the predictive increment corresponds to the future time, the kinematic data of that predictive increment is identified as the future kinematic data. The anticipatory lane change system may further include a determination module that determines whether a gap will be available at the potential lane change location at the future time based on the future kinematic data. The anticipatory lane change system may also include a lane change module that initiates a lane change maneuver for the host vehicle in response to determining that the gap will be available at the potential lane change location at the future time.

According to an additional aspect, an anticipatory lane change method for assisting a host vehicle positioned in a current lane that is changing to an adjacent lane is described. The anticipatory lane change method includes identifying a potential lane change location and receiving proximate vehicle data associated with proximate vehicles. The proximate vehicle data includes vehicle identifiers and current kinematic data. The anticipatory lane change method also includes identifying a set of proximate vehicles of the proximate vehicles. The proximate vehicle data in the set of proximate vehicles is compared to a prediction model to calculate a predictive increment of kinematic data. The anticipatory lane change method includes determining whether the predictive increment of kinematic data corresponds to a future time. The anticipatory lane change method additionally includes comparing the previous predictive increment to the prediction model to calculate kinematic data at a next predictive increment when the previous predictive increment does not correspond to the future time. The additional kinematic data is identified as the future kinematic data when the next predictive increment corresponds to a future time. The anticipatory lane change method includes determining whether a gap will be available at the potential lane change location at the future time based on the future kinematic data. A lane change maneuver is initiated for the host vehicle in response to determining that the gap will be available at the potential lane change location at the future time.

DETAILED DESCRIPTION

Figure 1:
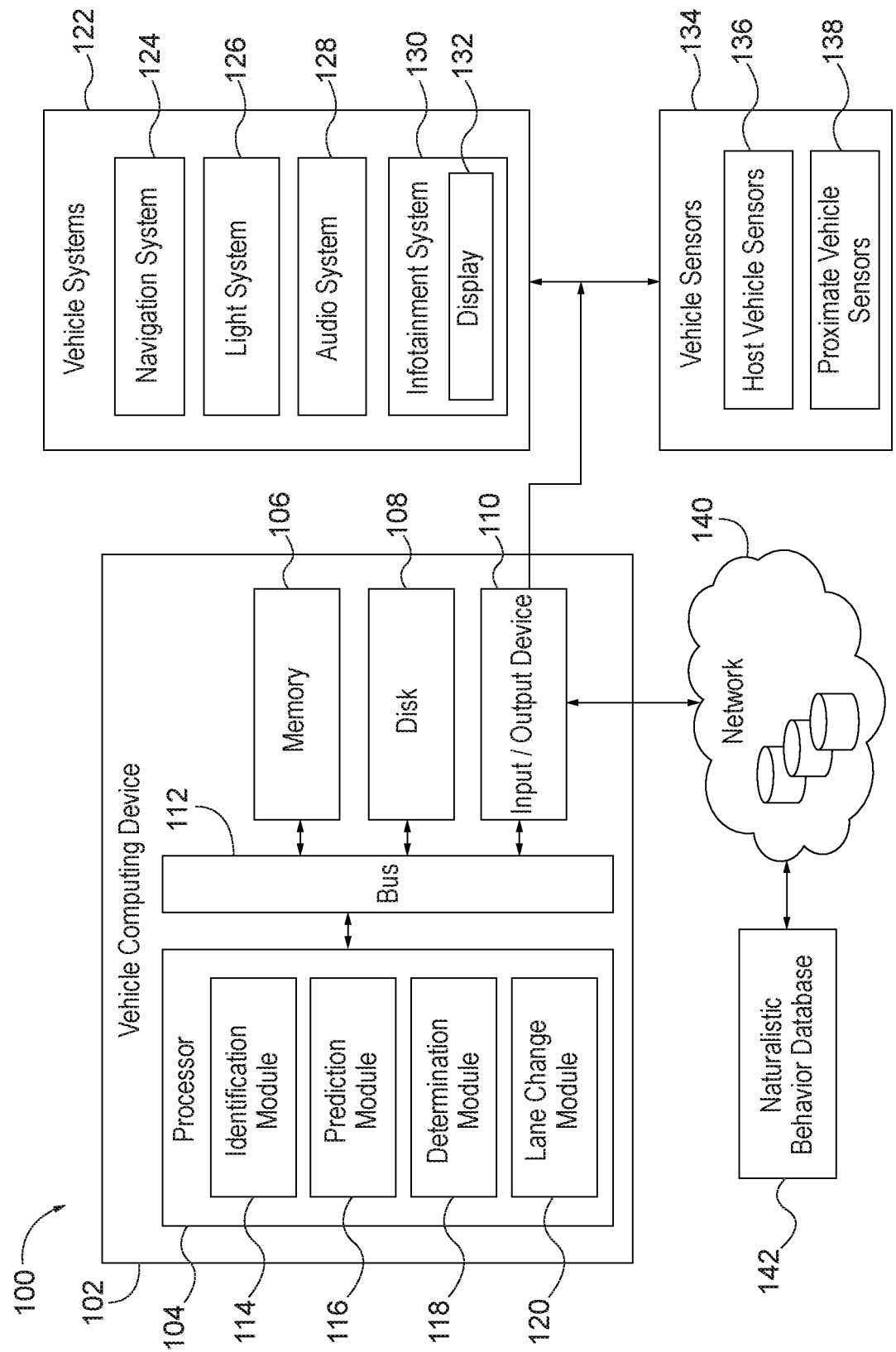
FIG. 1 is a schematic diagram of an operating environment for implementing systems and methods for anticipating lane change according to an exemplary embodiment.

Generally, the systems and methods disclosed herein are directed to anticipating behavior of proximate vehicles that may affect a lane change by the host vehicle. For example, when a driver of the host vehicle or the host vehicle wishes to make a lane change, an anticipatory lane change system searches for a potential lane change location that can accommodate a lane changing vehicle. To determine if a gap at the potential lane change location will be available by the time the lane changing vehicle is prepared to change lanes, the anticipatory lane change system models the behavior of downstream and upstream vehicles to account for the effects that downstream and upstream vehicles may have on the gap. For example, if the predicted speed and the predicted position of the proximate vehicles would reduce the predicted size of the gap below a threshold size, the anticipatory lane change system may abort the lane change maneuver automatically. Alternatively, if the predicted size of the gap is within an acceptable range, the lane changing vehicle executes a lane change maneuver and may also preemptively speed up or slow down based on the predicted behavior of the proximate vehicles. Accordingly, the anticipatory lane change system accounts for the traffic perturbations propagating from downstream and upstream proximate vehicles.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which a vehicle is travelling or is projected to travel along.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

System Overview

Referring now to the drawings, wherein the showings are for purposes of illustrating one or more exemplary embodiments and not for purposes of limiting same, FIG. 1 is a schematic diagram of an operating environment 100 for anticipatory lane change. The components of operating environment 100, as well as the components of other systems, hardware architectures, and software architectures discussed herein, can be combined, omitted, or organized into different architectures for various embodiments. Further, the components of the operating environment 100 can be implemented with or associated with a host vehicle, such as example host vehicle 300 (shown in FIG. 3).

In the illustrated embodiment of FIG. 1, the operating environment 100 includes a vehicle computing device (VCD) 102 with provisions for processing, communicating and interacting with various components of a vehicle and other components of the operating environment 100. In one embodiment, the VCD 102 can be implemented with the example host vehicle 300, for example, as part of a telematics unit, a head unit, a navigation unit, an infotainment unit, an electronic control unit, among others. In other embodiments, the components and functions of the VCD 102 can be implemented remotely from the example host vehicle 300, for example, with a portable device (not shown) or another device connected via a network (e.g., a network 140).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes an identification module 114, a prediction module 116, a determination module 118, and lane change module 120, for assisting a host vehicle in anticipating lane change locations and behavior, facilitated by the components of the operating environment 100.

The VCD 102 is also operably connected for computer communication (e.g., via the bus 112 and/or the I/O interface 110) to one or more vehicle systems 122. The vehicle systems 122 can include, but are not limited to, any automatic or manual systems that can be used to enhance the vehicle, driving, and/or safety. Here, the vehicle systems 122 include a navigation system 124, a light system 126, an audio system 128, and an infotainment system 130 according to an exemplary embodiment. The navigation system 124 stores, calculates, and provides route and destination information and facilitates features like turn-by-turn directions. The light system 126 controls the lights of the vehicle to actuate, including, for example, exterior lights (e.g., turn signal lights) and/or interior lights such as the dashboard lights. The audio system 128 controls audio (e.g., audio content, volume) in the example host vehicle 300. The infotainment system 130 provides visual information and/or entertainment and can include a display 132.

The vehicle systems 122 include and/or are operably connected for computer communication to various vehicle sensors 134. The vehicle sensors 134 provide and/or sense information associated with the vehicle, the vehicle environment, and/or the vehicle systems 122. The vehicle sensors 134 can include, but are not limited to, host vehicle sensors 136 associated with the vehicle systems 122, other vehicle sensors associated with the example host vehicle 300, and/or proximate vehicle sensors 138 that collect data regarding proximate vehicles that are proximate to the example host vehicle 300.

The host vehicle sensors 136 can include, but are not limited to, environmental sensors, vehicle speed sensors, accelerator pedal sensors, brake sensors, throttle position sensors, wheel sensors, anti-lock brake sensors, camshaft sensors, among others. In some embodiments, the host vehicle sensors 136 are incorporated with the vehicle systems 122. For example, one or more host vehicle sensors 136 may be incorporated with the navigation system 124 to monitor characteristics of the host vehicle, such as location and speed.

The proximate vehicle sensors 138 can include, but are not limited to, image sensors, such as cameras, optical sensors, radio sensors, etc. mounted to the interior or exterior of the example host vehicle 300 and light sensors, such as light detection and ranging (LiDAR) sensors, radar, laser sensors etc. mounted to the exterior or interior of the example host vehicle 300. Further, proximate vehicle sensors 138 can include sensors external to the example host vehicle 300 (accessed, for example, via the network 140), for example, external cameras, radar and laser sensors on other vehicles in a vehicle-to-vehicle network, street cameras, surveillance cameras, among others. The proximate vehicle sensors 138 monitor the environment of the example host vehicle 300 to detect the presence of proximate vehicle. Additionally, the proximate vehicle sensors 138 may detect characteristics of the one or more proximate vehicles, such as location and speed of the proximate vehicles, as well as relative characteristics of the host vehicle and the proximate vehicle, such as relative distance and speed between the host vehicle and the one or more proximate vehicles.

Accordingly, the vehicle sensors 134 are operable to sense a measurement of data associated with the vehicle, the vehicle environment, the vehicle systems 122, the example host vehicle 300, and/or the proximate vehicles and generate a data signal indicating said measurement of data. These data signals can be converted into other data formats (e.g., numerical) and/or used by the vehicle systems 122 and/or the VCD 102 to generate other data metrics and parameters. It is understood that the sensors can be any type of sensor, for example, acoustic, electric, environmental, optical, imaging, light, pressure, force, thermal, temperature, proximity, among others.

The VCD 102 is also operatively connected for computer communication to the network 140 and a naturalistic behavior database 142. It is understood that the connection from the I/O interface 110 to the network 140, and the naturalistic behavior database 142 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. It some embodiments, the naturalistic behavior database 142 could be located on-board the vehicle, at for example, the memory 106 and/or the disk 108. In other embodiments, the naturalistic behavior database 142 can be distributed in one or more locations.

The network 140 is, for example, a data network, the Internet, a wide area network or a local area network. The network 140 serves as a communication medium to various remote devices (e.g., databases, web servers, remote servers, application servers, intermediary servers, client machines, other portable devices). In some embodiments, the naturalistic behavior database 142 may be included in the network 140, accessed by the VCD 102 through the network 140, and/or the network 140 can access the naturalistic behavior database 142. Thus, in some embodiments, the VCD 102 can obtain data from the naturalistic behavior database 142 via the network 140.

Application of Systems and Methods

The application of systems and methods are described with respect to a host vehicle. A host vehicle is a vehicle having the operating environment 100 described above. The host vehicle may be a vehicle in a first lane 202 or a second lane 204 adjacent the first lane 202. Examples will be described in which either a lane changing vehicle 206 or a following vehicle 208 is a host vehicle or both the lane changing vehicle 206 and the following vehicle 208 are host vehicles. The examples are exemplary in nature and are not provided to be limiting. For example, an embodiment in which the lane changing vehicle 206 is a host vehicle does not imply that the following vehicle 208 is not a host vehicle. The following vehicle 208 may or may not be a host vehicle. Accordingly, the disclosed features and functions, or alternatives or varieties thereof, of the host vehicle may implemented by either a lane changing vehicle 206 or a following vehicle 208.

Figure 2:
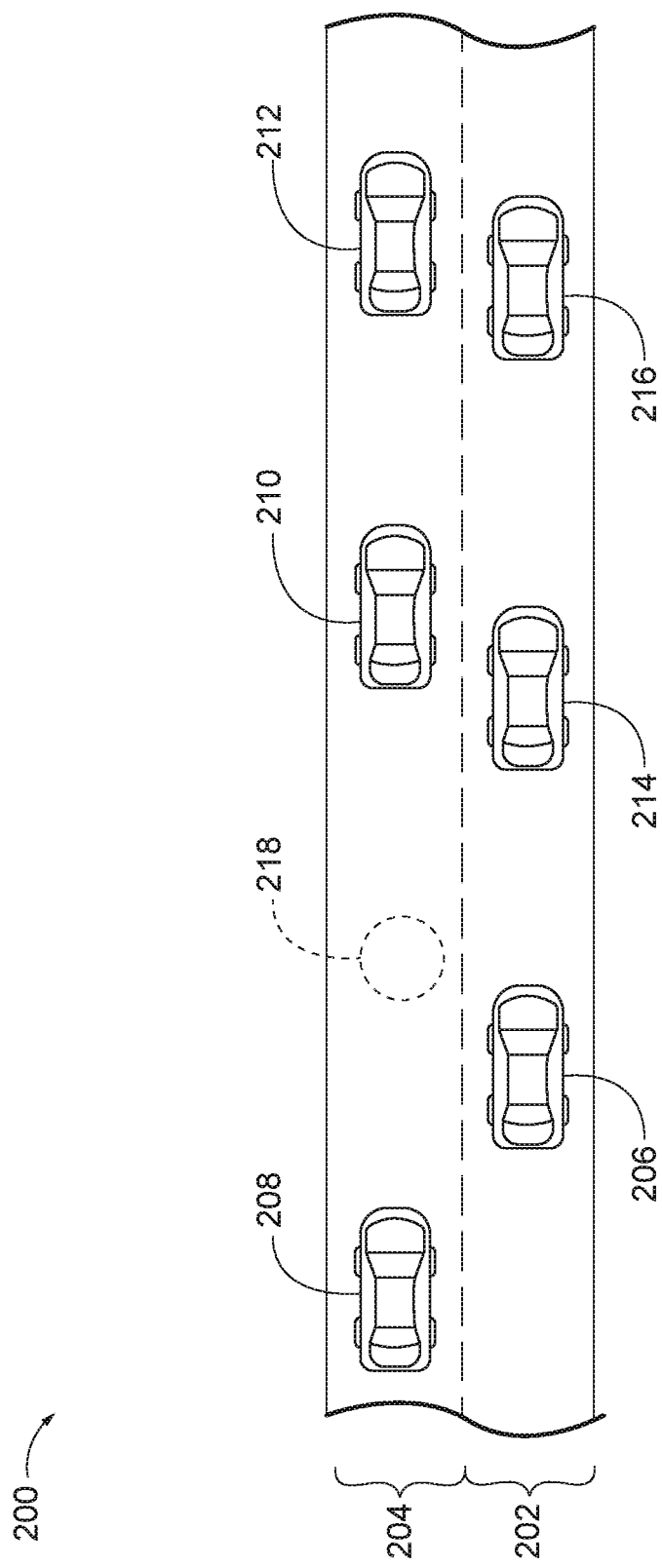
FIG. 2 is a schematic diagram of a host vehicle changing lanes into an adjacent lane according to an exemplary embodiment.

FIG. 1 is a schematic diagram of an operating environment 100 for implementing systems and methods for antici- patory lane change. In roadway example 200, shown in FIG. 2, has a first lane 202 and a second lane 204 adjacent the first lane 202. As discussed above, the lane changing vehicle 206 and/or the following vehicle 208 can be a host vehicle that employs the operating environment 100 to assist the host vehicle in anticipating traffic perturbations propagating from downstream proximate vehicles and facilitating lane changes. For example, in a first embodiment, the host vehicle may be the lane changing vehicle 206 that is attempting to change lanes from the first lane 202 into the second lane 204. In a second embodiment, the host vehicle may be the following vehicle 208 that is already traveling in the second lane 204 that the lane changing vehicle 206 is attempting to lane change into from the first lane 202. Alternatively, both the lane changing vehicle 206 and the following vehicle 208 may be host vehicles having the operating environment 100.

As described above, the operating environment 100 includes the processor 104 having the identification module 114. The identification module 114 identifies proximate vehicles in lanes having traffic moving in the same direction as the host vehicle. Returning to the first embodiment in which the lane changing vehicle 206 is the host vehicle, the identification module 114 identifies the following vehicle 208, a first preceding vehicle 210, and a second preceding vehicle 212 as proximate vehicles. The identification module 114 may additionally identify a first inline vehicle 214 and second inline vehicle 216 also traveling in the first lane 202 as proximate vehicles. In the second embodiment, in which the following vehicle 208 is the host vehicle, the identification module 114 identifies the lane changing vehicle 206 as a proximate vehicle in addition to the first preceding vehicle 210, the second preceding vehicle 212, the first inline vehicle 214, and the second inline vehicle 216.

Based on the identification of the proximate vehicles, the identification module 114 may identify a potential lane change location 218. For example, in the first embodiment, the host vehicle is the lane changing vehicle 206 that is attempting to change lanes from the first lane 202 into the second lane 204. The lane changing vehicle 206 may identify unoccupied space between to proximate vehicles, such as the following vehicle 208 and the first preceding vehicle 210 as the potential lane change location 218.

Returning to FIG. 1, the identification module 114 may identify at least one proximate vehicle using data received from the vehicle systems 122 and/or the proximate vehicle sensors 138 of the vehicle sensors 134. The proximate vehicle sensors 138 may include one or more optical sensors (e.g., radio detection and ranging (RADAR) device, light imaging detection and ranging (LiDAR) device, etc.), image sensors (e.g., camera, magnetic resonance imager, x-ray imager, etc.), and/or other ranging sensors.

Figure 3:
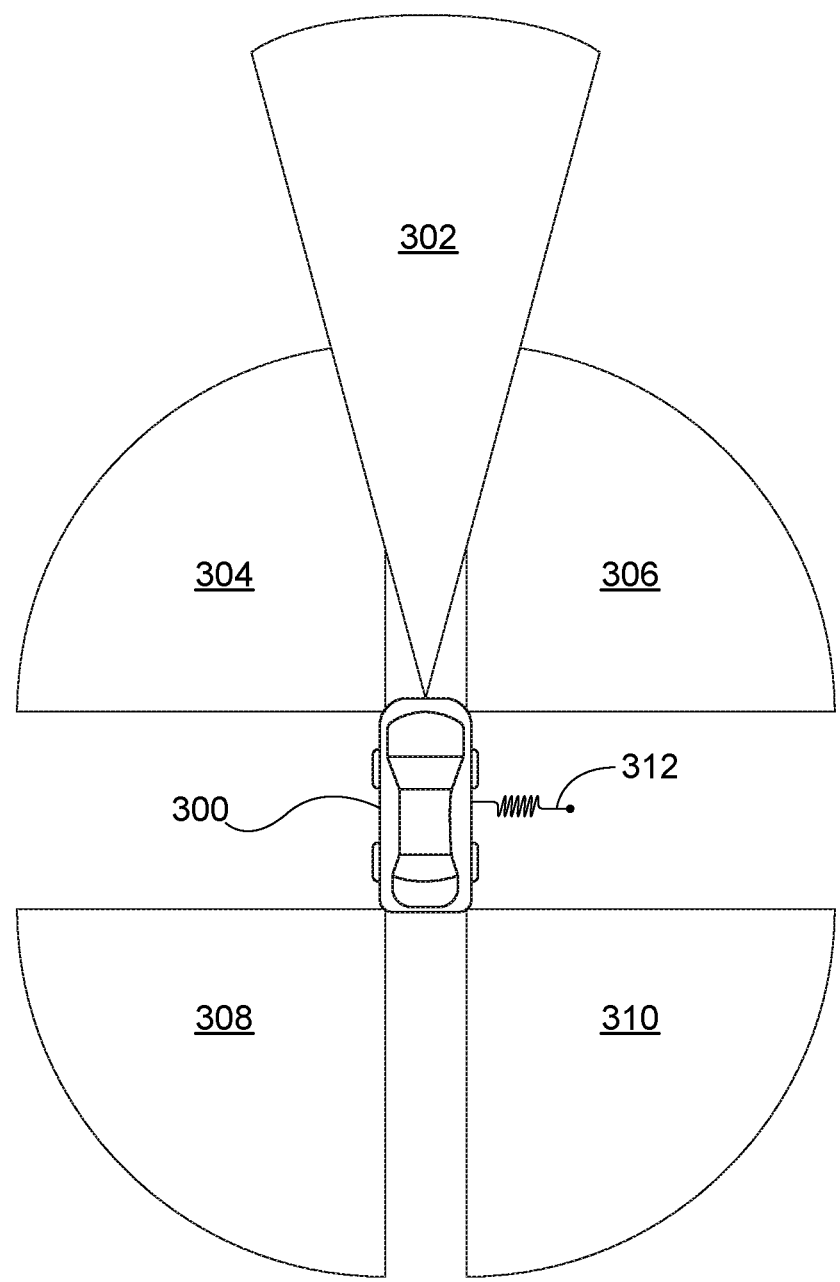
FIG. 3 is a schematic illustration of a host vehicle having example proximate vehicle sensors according to an exemplary embodiment.

An example host vehicle 300 having proximate vehicle sensors 138 is shown in FIG. 3. The proximate vehicle sensors 138 may include a forward sensor 302. The forward sensor may be image sensor, such as camera, or an optical sensor, such a RADAR or LiDAR device. As shown here, the forward sensor 302 may have a 160 meter range and a 20° field of view. The forward sensor 302 may be mounted to the interior or exterior of the example host vehicle 300. The mounting (not shown) of the forward sensor 302 may be fixable to hold the forward sensor 302 in a fixed position or a radial mounting to allow the forward sensor 302 to rotate about the example host vehicle 300. The forward sensor 302 may detect visible and infra-red light from the proximate vehicles. The forward sensor 302 may also detect a pattern of light in images processed by the identification module 114 or one of the vehicle systems 122. The pattern of light may indicate that at least one proximate vehicle has illuminated a turn signal or identify lane markings on the pavement.

The proximate vehicle sensors 138, may additionally include corner sensors 304, 306, 308, and 310. In one embodiment, the corner sensors 304, 306, 308, and 310 may be RADAR sensors or any other kind of sensors for identifying at least one proximate vehicle, such as LiDAR. The proximate vehicle sensors 138 can be disposed on any location of the interior or exterior of the example host vehicle 300. For example, the proximate vehicle sensors 138 can be disposed in the doors, bumpers, wheel wells body, rearview mirror, side view mirror, dashboard, rear window, etc. In one example, the corner sensors 304, 306, 308, and 310 may be mounted at the corners of the vehicle, and each of the corner sensors 304, 306, 308, and 310 may have an 80 meter range and a 90° field of view.

Returning to FIG. 1, the proximate vehicle sensors 138 measure data from proximate vehicles located near the host vehicle. For example, the proximate vehicle sensors 138 may measure data associated with the timing, location, velocity, and acceleration of a proximate vehicle and attribute that measured data to the proximate vehicle using a vehicle identifier. The identification module 114 receives the measured data from the proximate vehicle sensors 138 to identify the proximate vehicles and generates the corresponding proximate vehicle data.

The proximate vehicle sensors 138 may be continuously or periodically measuring data with respect to proximate vehicles near the host vehicle. For example, the measured data may be tracked for proximate vehicles such that the measured data can be used to generate current kinematic data (e.g., position, velocity, and acceleration) that reflects the current motion of proximate vehicles, and includes relative data between the proximate vehicles (e.g., relative velocity, spacing between proximate vehicles, etc.). In this manner, the current kinematic data is a snapshot of a proximate vehicle represented by various values of motion data. For example, the kinematic data may include an acceleration value based on the measured data that the proximate vehicle sensors have been aggregating.

The current kinematic data may be assigned to the applicable proximate vehicle based on the measured data from the proximate vehicle sensors 138. For example, the vehicle identifier may be appended to the current kinematic data. Thus, the identification module 114 can calculate the current kinematic data for a specific proximate vehicle from the measured data from the proximate vehicle sensors 138 and attribute the current kinematic data to that specific proximate vehicle.

Alternatively, the identification module 114 may receive proximal vehicle data directly from the proximate vehicles over the network 140 as computer communication received at the transceiver 312 (shown in FIG. 3). For example, the transceiver 312 may allow the example host vehicle 300 to receive the proximal vehicle data over a vehicle-to vehicle network directly from the proximate vehicles. In this manner, the identification module 114 may receive the current kinematic data and/or a vehicle identifier directly from a proximate vehicle. In another embodiment, the identification module 114 may receive the proximate vehicle data from remote sensors (accessed, for example, via the network 140), for example, external cameras, street cameras, surveillance cameras, in-pavement sensors, among others. Accordingly, the identification module 114 can receive proximate vehicle data for proximate vehicles that are outside of the range of the host vehicle's proximate sensors 138, such as the forward sensor 302 and/or corner sensors 304, 306, 308, and 310.

The identification module 114 may identify proximate vehicles in real-time and/or store, aggregate, and track data regarding previously identified proximate vehicles. The identification module 114 may additionally identify one or more lane change indicators that indicate that a proximate vehicle may be about to attempt a lane change. In the first embodiment, in which the lane changing vehicle 206 is the host vehicle, activating the turn signal may be a lane change indicator. In the second embodiment, the host vehicle is a vehicle in the second lane 204, such as the following vehicle 208. The lane change indicators, in the second embodiment, may include turn signal illumination on a proximate vehicle, proximity of the proximate vehicle to the host vehicle or pavement lines, an obstacle (not shown) in a lane, traffic congestion, etc. For example, the host vehicle may detect a turn signal being illuminated on a proximate vehicle. In another example, the identification module 114 may identify the lane changing vehicle 206 as attempting to change into the second lane 204 based on a plurality of lane change indicators.

In one embodiment, the identification module 114 may flag at least one of the proximate vehicles as about to change lanes based a threshold number of lane change indicators being identified. In another embodiment, the lane change indicators may be tiered. For example, turn signal illumination may be a first tier lane change indicators on a proximate vehicle while the proximity of the proximate vehicle to the host vehicle or pavement lines, and an obstacle in the first lane 202 may be second tier lane change indicators. The identification module 114 may flag a proximate vehicle as about to change lanes when a single first tier lane change indicators is identified but may only flag a proximate vehicle if two or more second tier lane change indicators are identified. While two tiers are described, more or fewer tiers may be employed. Accordingly, in addition to identifying a potential lane change location and receiving proximate vehicle data, the identification module 114 may identify specific lane change behavior based on lane change indicators.

Furthermore, the identification module 114 may calculate missing current kinematic data. For example, suppose the identification module 114 receives measured data including position, velocity, and timing information of the following vehicle 208 and the first preceding vehicle 210. The identification module 114 may generate the current kinematic data using the measured data such that the current kinematic data includes position, velocity, and acceleration for the following vehicle 208 and the first preceding vehicle 210 may be measured by the proximate vehicle sensors 138. However, the second preceding vehicle 212 may be out of the range of the proximate vehicle sensors 138 in this example. Accordingly, the current kinematic data, including position, velocity, and acceleration, of the second preceding vehicle 212 may be received as computer communication over the network 140.

The prediction module 116 of the processor 104 predicts future kinematic data at a future time for at least some of the proximate vehicles. The future kinematic data is calculated based on current kinematic data of the proximate vehicle data. In one embodiment, the prediction module 116 uses the current kinematic data of the following vehicle 208, the first preceding vehicle 210, and the second preceding vehicle 212 to predict future kinematic data for the following vehicle 208, the first preceding vehicle 210, and the second preceding vehicle 212 at a future time. To predict the future kinematic data at the future time, the prediction module 116 iteratively calculates kinematic data at predictive increments for each of the proximate vehicles, such as the following vehicle 208, the first preceding vehicle 210, and the second preceding vehicle 212 until the predictive increment corresponds to the future time. The future time is a time separated from the current time by a number predictive increments extending into the future. Accordingly, the future time corresponds to a plurality of seconds, and each predictive increment corresponds to a particular time step less than the total from current to the future time.

As a prediction example, suppose the future time is 3 seconds in the future. The prediction module 116 may calculate kinematic data in one second predictive increments for the following vehicle 208, the first preceding vehicle 210, and the second preceding vehicle 212. In other words, the prediction module 116 uses the current kinematic data at time, T=0 seconds for the following vehicle 208, the first preceding vehicle 210, and the second preceding vehicle 212, to predict kinematic data for the following vehicle 208, the first preceding vehicle 210, and the second preceding vehicle 212 at a first predictive increment corresponding to T=1 second.

However, in this prediction example, the future time corresponds to T=3. Accordingly, the prediction module 116 uses the kinematic data from the first predictive increment (T=1) to predict additional kinematic data for the following vehicle 208, the first preceding vehicle 210, and the second preceding vehicle 212 at a second predictive increment corresponding to T=2 seconds. Since the second predictive increment also does not correspond to the future time, the prediction module 116 uses the additional kinematic data from the second predictive increment to predict additional kinematic data at a third predictive increment corresponding to T=3 seconds. Because the additional kinematic data at a third predictive increment does correspond to the future time (T=3), the prediction module 116 identifies the additional kinematic data, from T=3, as the future kinematic data for the following vehicle 208, the first preceding vehicle 210, and the second preceding vehicle 212. In this manner, the prediction module 116 iteratively calculates kinematic data at predictive increments until the prediction module 116 identifies the future kinematic data for the proximate vehicles.

Figure 4A:
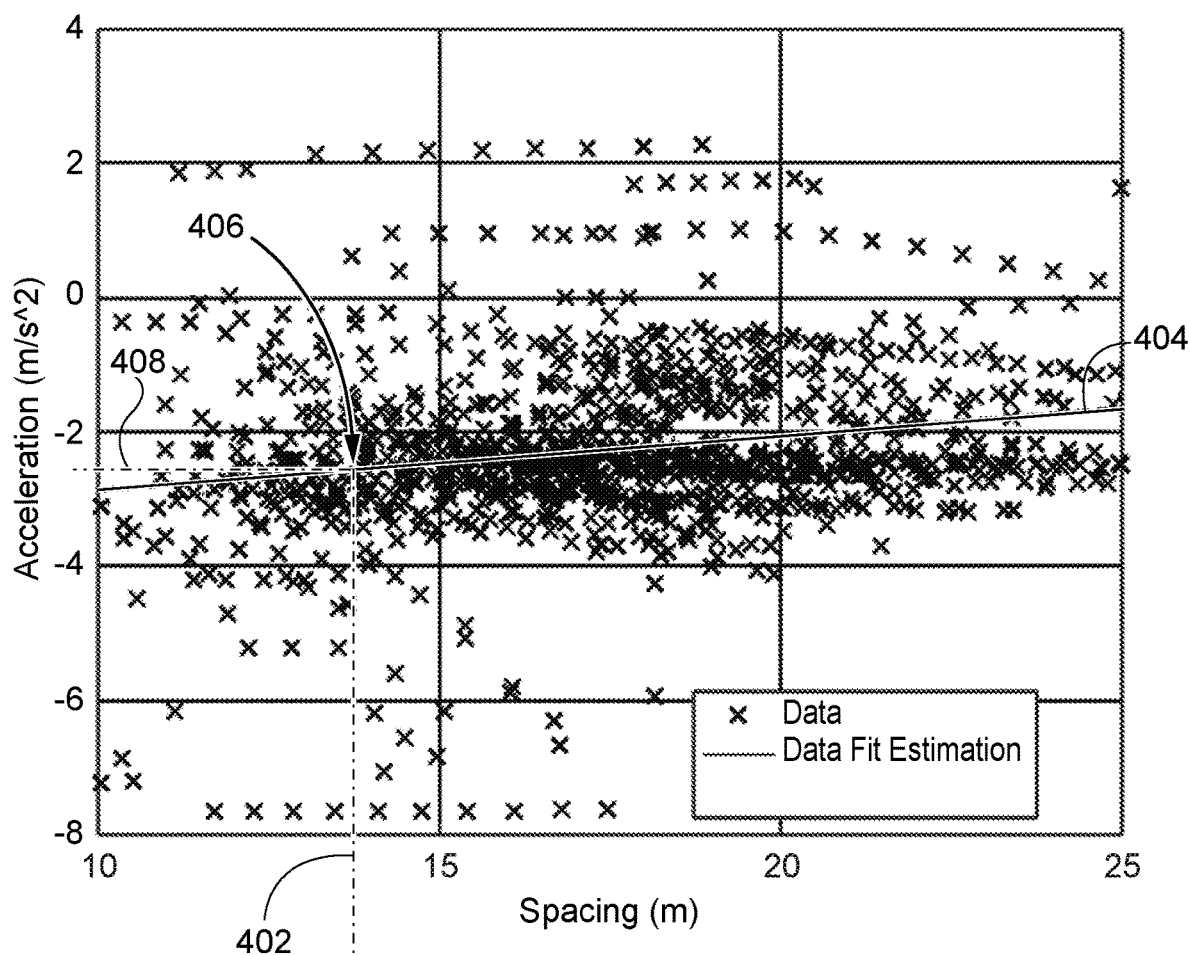
FIG. 4A is an exemplary prediction plot for a prediction model according to an exemplary embodiment.
Figure 4B:
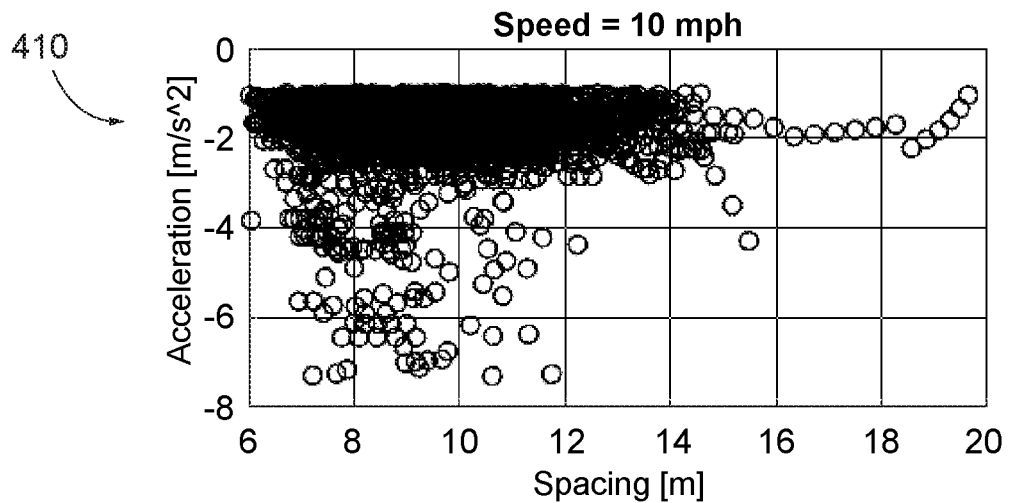
FIGS. 4B-4H includes exemplary prediction plots based on differential speed bins according to an exemplary embodiment.
Figure 4C:
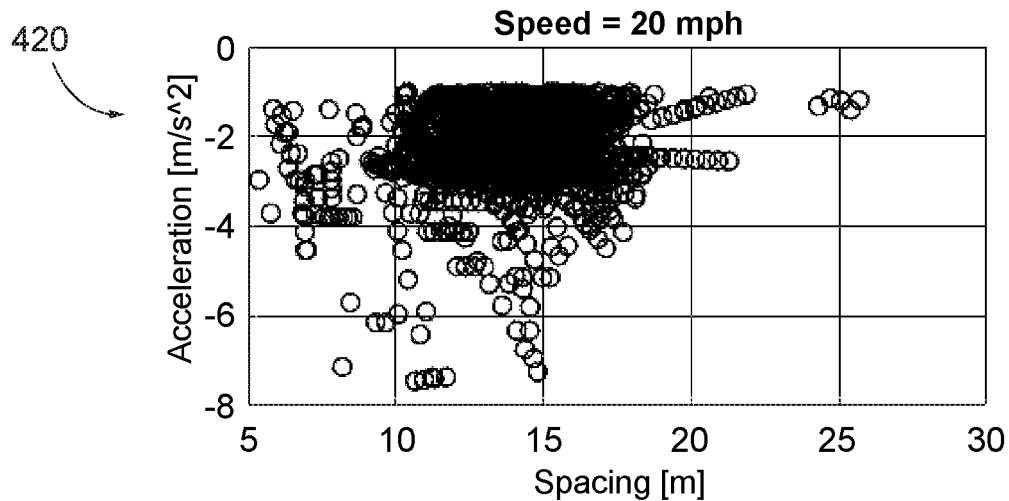
Figure 4D:
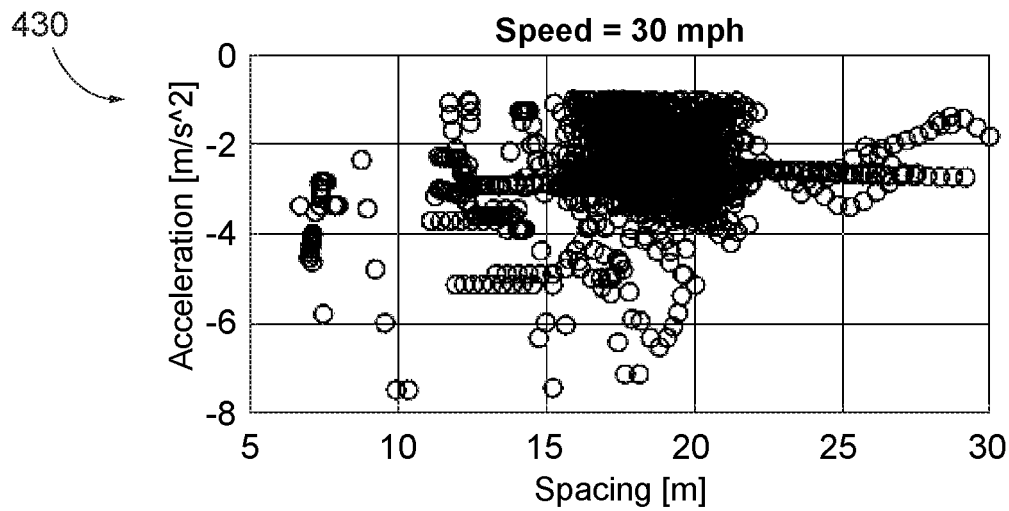
Figure 4E:
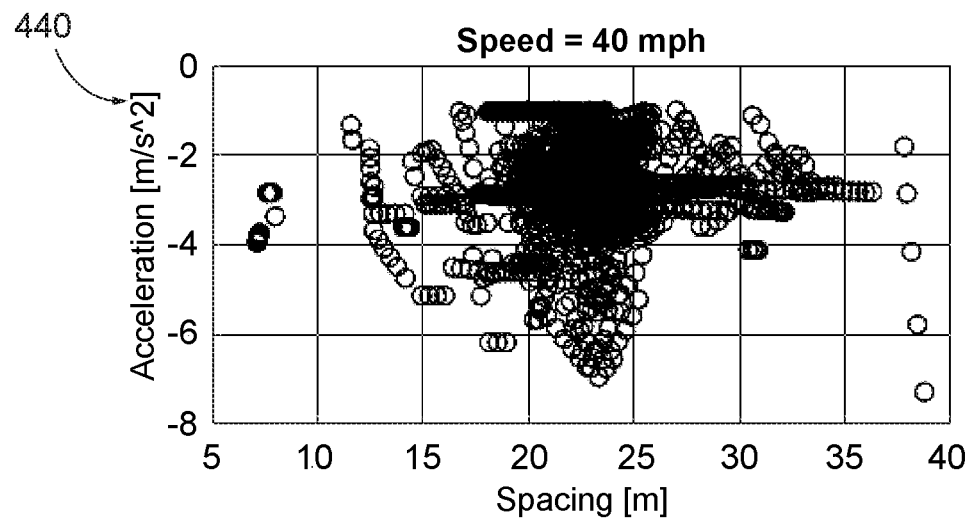
Figure 4F:
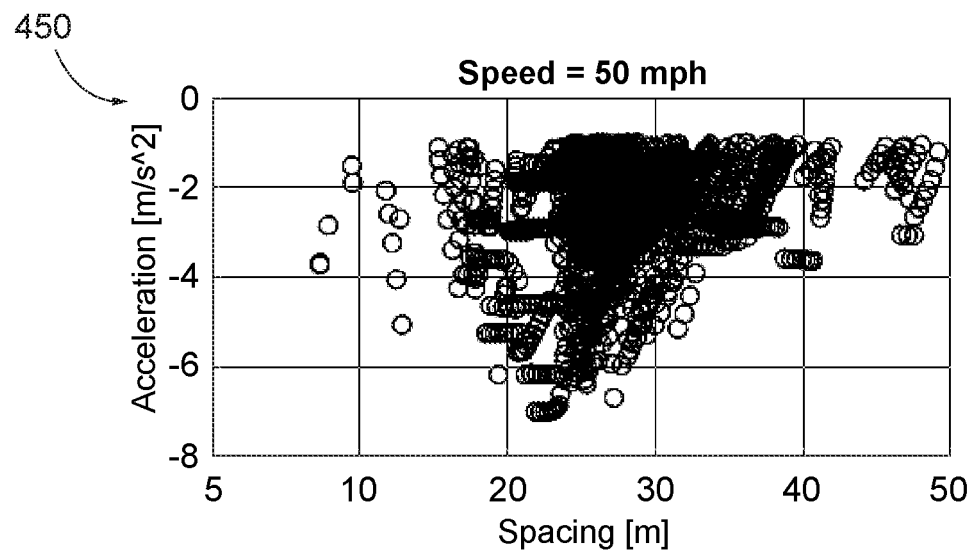
Figure 4G:
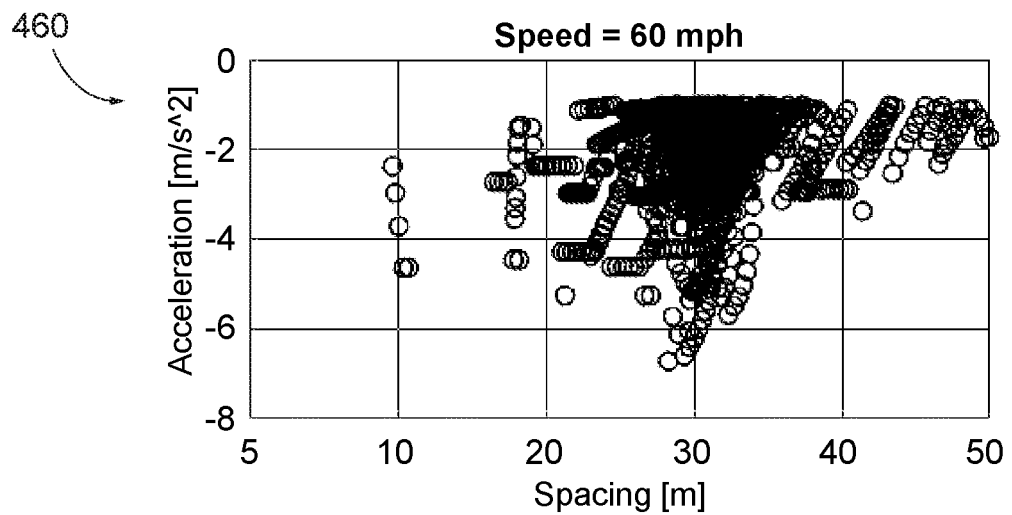
Figure 4H:
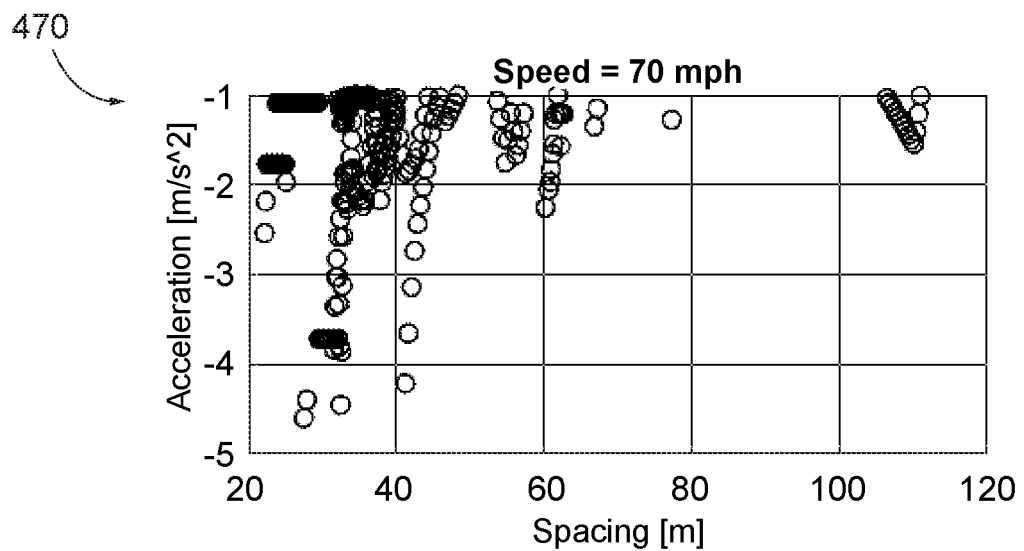

The prediction module 116 may calculate kinematic data by comparing the previous kinematic data to a prediction model of a set of prediction models. A prediction model predicts future kinematic data based on current kinetic data and/or previous kinematic data. The prediction plot 400 shown in FIG. 4A is an illustrative example of a prediction model and will be described with respect to FIG. 2. The prediction plot 400 illustrates the manner in which spacing at the potential lane change location 218 is relative to the acceleration between the following vehicle 208 and the first preceding vehicle 210. Accordingly, in one embodiment, the prediction plot 400 can be used to predict the acceleration of the following vehicle 208.

Referring to the prediction example given above, at the current time T=0, the prediction module 116 uses the current kinematic data, including the velocity of the following vehicle 208 and the relative velocity and spacing between the following vehicle 208 and the first preceding vehicle 210 to predict the acceleration of the following vehicle 208. Suppose the prediction plot 400 is selected from the set of prediction models for the following vehicle 208. The prediction plot 400 compares the spacing 402 between the following vehicle 208 and the first preceding vehicle 210 to the data-fit estimation 404. The data-fit estimation 404 may be determined using any data fitting methodology such as linear regression, best-fit modeling, and other fit functions.

The spacing 402 intersects with the data-fit estimation 404 at intersection point 406. The prediction module 116 predicts the future acceleration 408 of the following vehicle 208 relative to the intersection point 406. The future acceleration 408 corresponds to one predictive increment of the predictive module 116, thus here, the future acceleration 408 would correspond to kinematic data at a first predictive increment corresponding to T=1 second.

FIG. 4a is an exemplary prediction plot corresponding to a prediction model for predicting the acceleration of a following vehicle or vehicle spacing based on the differential speed between a pair of vehicles. Any number of prediction plots may be used based on the data used to construct the prediction model. Thus, different prediction plots, that relate different values of kinematic data (e.g., position, timing, velocity, acceleration, spacing, etc.) may be used to predict the future kinematic data.

The prediction model may be based on simulated data or naturalistic data. For example, the prediction model may be based on second-by-second vehicle trajectory data from a Verkehr In Städten-Simulations model (VISSIM) freeway network. The naturalistic data may include data from the host vehicle such as the monitored behavior, monitored behavior of vehicles on a specific roadway, or monitored behavior of a number of vehicles on one or more roadways may be aggregated as global data. The monitored behavior may be received by the naturalistic behavior database 142 via network 140 from roadway sensors such as traffic cameras, captured video of roadways, in-pavement sensors, and vehicle sensors from other vehicles on the roadway, amongst others.

The data, naturalistic and/or simulated, is arranged into sets based on the kinematic data. In some embodiments, the prediction module 116 may access a bin of data based on a feature of the kinematic data. For example, the data may be arranged into bins corresponding to different ranges of kinematic data, such as ranges velocity differential between the following vehicle 208 and the first preceding vehicle 210.

In one embodiment, the sets of data are arranged into bins represented by FIGS. 4B-4G. For example, the prediction module 116 may access the dataset illustrated by the prediction plot 410 of FIG. 4B if the velocity differential between the following vehicle 208 and the first preceding vehicle 210 is 0-10 mp, the dataset illustrated by the prediction plot 420 of FIG. 4C if the velocity differential between the following vehicle 208 and the first preceding vehicle 210 is 11-20 mph, the dataset illustrated by the prediction plot 430 of FIG. 4D if the velocity differential between the following vehicle 208 and the first preceding vehicle 210 is 21-30 mph, the dataset illustrated by the prediction plot 440 of FIG. 4E if the velocity differential between the following vehicle 208 and the first preceding vehicle 210 is 31-40 mph, the dataset illustrated by the prediction plot 450 of FIG. 4F if the velocity differential between the following vehicle 208 and the first preceding vehicle 210 is 41-50 mph, or the dataset illustrated by the prediction plot 460 of FIG. 4G if the velocity differential between the following vehicle 208 and the first preceding vehicle 210 is 51-60 mph. The prediction plots 400 and 410-460 are illustrative of the data binning and data fit estimation being used to predict a kinematic data at predictive increments, however, the data may be used as a look-up table or other accessible data form.

In a similar manner, the prediction module 116 may iteratively predict future kinematic data between the first preceding vehicle 210 and the second preceding vehicle 212 at the predictive increments. The interaction between the first preceding vehicle 210 and the second preceding vehicle 212 affects the spacing between the following vehicle 208 and the first preceding vehicle 210. For example, should the second preceding vehicle 212 decelerate, the first preceding vehicle 210 will likely also decelerate, thereby reducing the spacing between the following vehicle 208 and the first preceding vehicle 210. Thus, the prediction module 116 may predict future kinematic data between two pairs of proximate vehicles: (1) the following vehicle 208 and the first preceding vehicle 210 and (2) the first preceding vehicle 210 and the second preceding vehicle 212 in order to account for downstream and upstream effects.

The prediction module 116 may additionally predict future kinematic data for inline pairs of vehicles including (3) the lane changing vehicle 206 and the first inline vehicle 214, and (4) the first inline vehicle 214 and the second inline vehicle 216. Like the first preceding vehicle 210 and the second preceding vehicle 212, the prediction module 116 predicts future kinematic data between the first inline vehicle 214 and the second inline vehicle 216 because the interactions of these vehicles propagate back upstream towards the lane changing vehicle 206. For example, the lane changing vehicle 206 may not be able to move to the potential lane change location 218 if the second inline vehicle 216 decelerates causing the first inline vehicle 214 to also decelerate.

Once the future kinematic data is predicted by the prediction module 116, the determination module 118 uses the future kinematic data to determine whether a gap will be available at the potential lane change location identified by the identification module 114. For example, the determination module 118 may determine if the gap at the potential lane change location is sufficiently large for the lane change vehicle as will be described with respect to FIG. 5.

Figure 5:
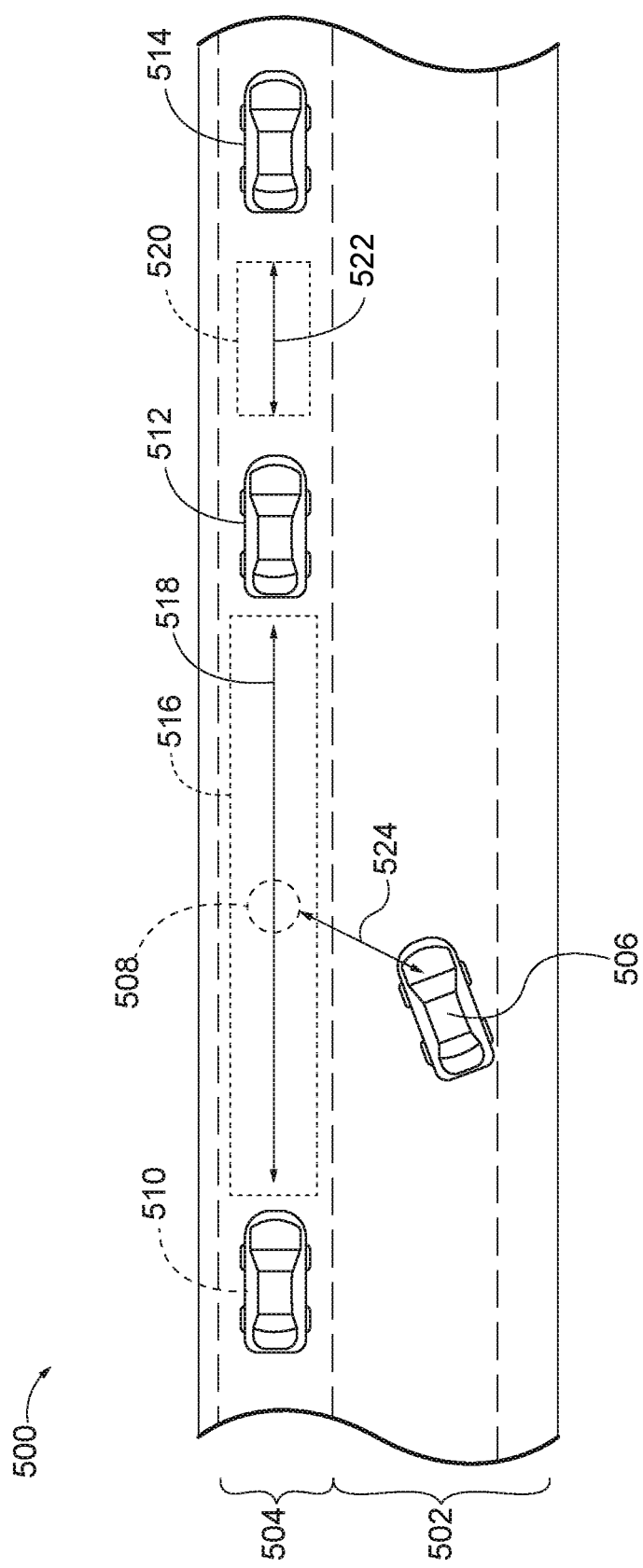
FIG. 5 is a schematic diagram of a lane changing vehicle moving to a gap according to an exemplary embodiment.

FIG. 5 is a schematic diagram of a roadway having a first lane 502 and a second lane 504. A lane changing vehicle 506 is anticipating moving to a potential lane change location 508, which is bounded by a following vehicle 510 and a first preceding vehicle 512. A second preceding vehicle 514 is downstream of the first preceding vehicle 512. A first gap 516 present at the potential lane change location 508. The spacing of the first gap 516 is measured as the first gap length 518 between the following vehicle 510 and the first preceding vehicle 512. A second gap 520 is positioned between the first preceding vehicle 512 and the second preceding vehicle 514. Thus, the spacing of the second gap length 522 is measured as distance between the first preceding vehicle 512 and the second preceding vehicle 514.

In one embodiment, the following vehicle 510 is a host vehicle. When the lane changing vehicle 506 is within a lane changing distance 524 of the potential lane change location 508, the following vehicle 510, determines if the first gap 516 will be available to the lane changing vehicle 506. For example, the determination module 118 of the following vehicle 510 may determine that the first gap 516 will not be available because the first gap length 518 will be insufficient to accommodate the lane changing vehicle 506 at the future time. Accordingly, the lane change module 120 may control the vehicle systems 122 of the following vehicle 510 to adjust a kinematic parameter (e.g., position, speed, acceleration, braking) to increase the first gap length 518, thereby making the first gap 516 available to the lane changing vehicle 506.

Alternatively, suppose the lane changing vehicle 506 is the host vehicle. In another embodiment, a determination module 118 of the lane changing vehicle 506 may determine whether the first gap 516 at the potential lane change location 508 will be sufficient size to accommodate the lane changing vehicle 506. The vehicle sensors 134 of the lane changing vehicle 506 may measure the first gap length 518 of the first gap 516. The first gap length 518 may be defined by the distance from the following vehicle 510 to the first preceding vehicle 512. The first gap length 518 may be compared to a gap threshold value to determine whether the first gap 516 is of sufficient size to accommodate the lane changing vehicle 506. In some embodiments, the gap threshold is twice the length of the lane changing vehicle 506. In some embodiments, the first gap length 518 being greater than the gap threshold value indicates that the first gap 516 will have sufficient size to accommodate the lane changing vehicle 506. Conversely, the first gap length 518 being less than the gap threshold value indicates that the first gap 516 will not have sufficient size to accommodate the lane changing vehicle 506.

Similarly, the determination module 118 may determine if the motion effects of the second preceding vehicle 514 will propagate upstream based on the future kinematic data between the first preceding vehicle 512 and the second preceding vehicle 514. The determination module 118 may account for the effects of the second gap length 522 on the first gap length 518. For example, if the second gap length 522 is decreasing the determination module 118 may similarly determine the first gap length 518 is decreasing. When combined with other future kinematic data, such as deceleration values of one or more proximate vehicles, the determination module 118 may determine that the first gap 516 will be unavailable.

In response to determining that the first gap 516 is of sufficient size, the lane change module 120 causes the lane changing vehicle 506 to initiate a lane change maneuver. Here, the lane change maneuver may include the lane change module 120 controlling the vehicle systems 122 to change a kinematic parameter of the lane changing vehicle 506 that causes the lane changing vehicle 506 move into the first gap 516 in the second lane 504. Thus, the lane change maneuver may include changing a kinematic parameter of the host vehicle to cause the host vehicle to move into the first gap 516 at the potential lane change location 508 or making the first gap 516 available to a lane changing vehicle 506. For example, a longitudinal speed control, measured by the host vehicle sensors 136, may continue in order to stay in-between the following vehicle 510 and the first preceding vehicle 512, the host vehicle is steered according to a course angle, such as 20°, to move from the first lane 502 into the second lane 504, and check for lane change completion.

In some embodiments, initiating a lane change maneuver may additionally or alternatively, include alerting a vehicle occupant to the possibility of a lane change. For example, the navigation system 124 may illustrate lane change parameters, such as location, distance, and direction to the potential lane change location 508. The lane change parameters may be displayed on the display 132 of the infotainment system 130 or a heads-up display (not shown).

The lane change module 120 may control the lane changing vehicle 506 to operate or maneuver in way that facilitates the lane changing vehicle 506 moving into the first gap 516 based on the host vehicle sensors 136 measurements of position and speed. For example, the lane change module 120 may trigger an autonomous driving system or an assisted driver-assistance system to cause the lane changing vehicle 506 to operate or maneuver accordingly. In response to determining that the first gap 516 does not have a sufficient size, the lane change module 120 may cause the prediction module 116 to predict an updated lane change location. Accordingly, the prediction module 116 will update the potential lane change location, when a previously potential lane change location is unavailable. The updated potential lane change location is calculated in the same manner as described above incorporating the current relative position of the proximate vehicles, such as the following vehicle 510, the first preceding vehicle 512, and the second preceding vehicle 514.

In this manner, kinematic data may be iteratively determined until the lane changing vehicle 506 chooses not to change lanes or moves into the first gap 516. The predicted lane change may also account for proximate vehicles in line with the lane changing vehicle 506. For example, returning to FIG. 2, the identification module 114 may receive proximate vehicle data for the first inline vehicle 214 and the second inline vehicle 216. The anticipatory lane change system provides smooth lane change assistance. Thus, the lane change behavior system implements a lane changing method and system that facilitates lane change location prediction based on naturalistic datasets and improves a vehicle occupants experience through smarter lane change maneuvers in high stress situations.

Figure 6:
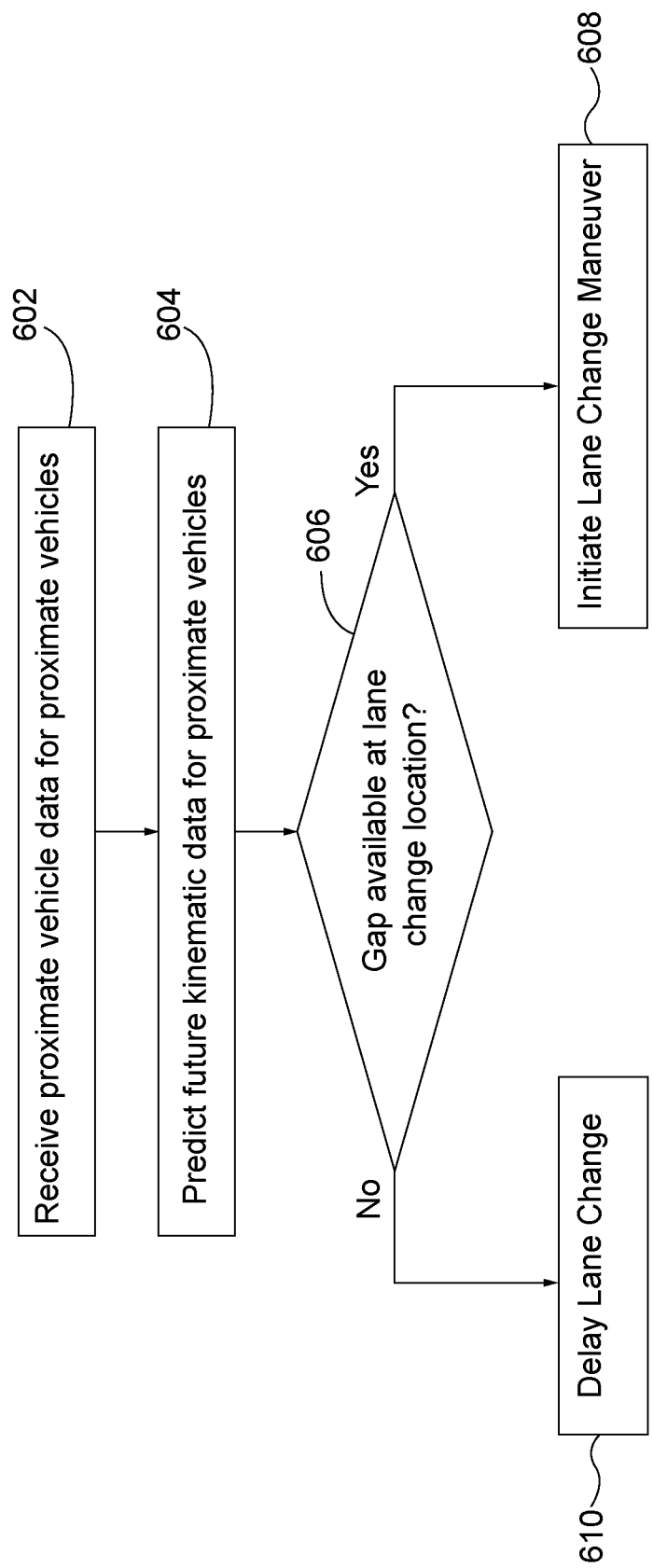
FIG. 6 is a process flow diagram of a method for anticipatory lane change according to an exemplary embodiment.

FIG. 6 is a process flow diagram of a method for anticipatory lane change according to an exemplary embodiment and will be described with respect to FIGS. 1 and 5. It is understood that the illustrative examples discussed herein are exemplary in nature and that varying host vehicles, vehicle models, and kinematic parameters can be implemented.

At block 602, the method includes receiving proximate vehicle data associated with proximate vehicles, wherein the proximate vehicle data includes vehicle identifiers and current kinematic data. The identification module 114 receives data streams from proximate vehicle sensors 138 or over the network 140 to determine if one or more proximate vehicles is proximate the host vehicle. Data streams may also be received by the identification module 114 from remote sensors (e.g., traffic cameras, in-pavement sensors, vehicle-to-vehicle network) over the network 140. In some embodiments, a vehicle within a proximate distance radius of the host vehicle is identified as a proximate vehicle. The proximate distance radius may be a predetermined radial distance measured from the host vehicle.

In one embodiment, three or more vehicles may be identified as proximate vehicles including the following vehicle 510, the first preceding vehicle 512, and the second preceding vehicle 514 (shown in FIG. 5). Accordingly, proximate vehicle data will be received for the three or more vehicles. The proximate vehicle data may be received from proximate vehicle sensors 138 on the host vehicle and/or as computer communication (e.g., vehicle-to vehicle data) via the network 140. Accordingly, the host vehicle can receive proximate vehicle data from a proximate vehicle even if a proximate vehicle is out of range of the proximate vehicle sensors 138.

At block 604, the method includes predicting future kinematic data for the proximate vehicle based on the proximate vehicle data. For example, the host vehicle may iteratively calculate kinematic data at predictive increments until it is determined that the predictive increment corresponds to the future time. The future kinematic data includes information about the proximate vehicles individually as well as information about the proximate vehicles relative to one another. For example, the future kinematic data may include a predicted acceleration value for the following vehicle 508 as well as the first gap length 518 between the following vehicle 510 and the first preceding vehicle 512.

At block 606, the method includes determining whether a gap will be available at the potential lane change location at the future time based on the future kinematic data. Whether a gap is available is determined based on the predicted future kinetic data. For example, the determination may be based on whether the first gap length 518 at the future time will accommodate the lane changing vehicle 506.

At block 608, the method includes initiating a lane change maneuver for the host vehicle in response to determining that the gap will be available at the potential lane change location at the future time. Initiating the lane change maneuver may include adjusting a kinematic parameter of the host vehicle. Suppose the host vehicle is changing lanes, the kinematic parameter may be adjusted to bring the lane changing vehicle laterally in-line with the potential lane change location 508. For example, a kinematic parameter may be adjusted to bring the host vehicle within the lane changing distance 524 of the potential lane change location 508. Alternatively, suppose that the host vehicle is the following vehicle 510, the kinematic parameter may be adjusted to maintain or increase the first gap 516 at the potential lane change location 508.

The kinematic parameter may be adjusted by the lane change module 120. In some embodiments, the lane change module 120 may adjust the kinematic parameter with an advanced driver-assistance system or autonomous driving system (not shown). In another embodiment, the lane change module 120 may employ vehicle systems 122 such as the anti-lock brake system, the brake assist system, the automatic brake prefill system, the low speed follow system, or the cruise control system to adjust the kinetic parameter.

Initiating a lane change maneuver may include one or more of triggering an audio cue (e.g., sound alert, vocal alert, etc.) through the audio system 128 and/or triggering a visual cue including a visual indication of lane changing directions through the navigation system 124, an illumination sequence controlled by the light system 126, or other visual cue that may be displayed on the display 132, heads-up-display projection through the infotainment system 130. By facilitating the lane change maneuver, the systems and methods described here provide an improved driver experience.

At block 610, the method includes delaying a lane change maneuver for the host vehicle in response to determining that the gap will be available at the potential lane change location at the future time. For example, suppose the host vehicle is changing lanes, the delay may be a predetermined amount of time or until different proximate vehicles are sensed proximal to the host vehicle. Alternatively, suppose that the host vehicle is the following vehicle 510, the host vehicle may delay to monitor the behavior of the lane changing vehicle 506.

Figure 7:
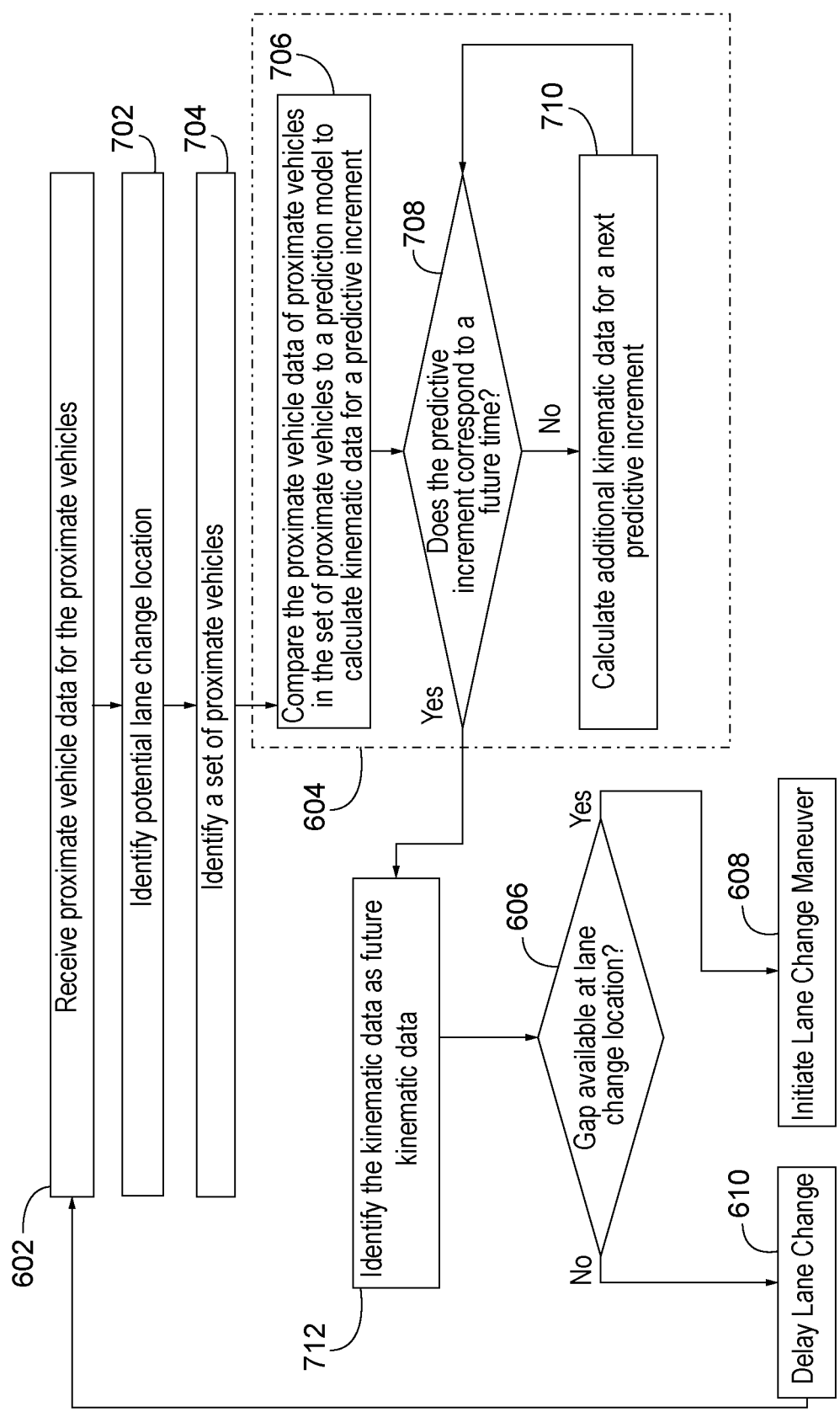
FIG. 7 is a process flow diagram of a method for anticipatory lane change including calculating predictive increments according to an exemplary embodiment.

FIG. 7 is a process flow diagram of a method for anticipatory lane change including calculating predictive increments according to an exemplary embodiment. FIG. 7 has blocks 602, 606, 608, and 610 that are similar to those discussed with respect to FIG. 6 above and are described with respect to FIG. 5. Blocks 706-710 describe methodology corresponding to block 604 discussed with respect to FIG. 6 above and are described with respect to FIG. 5. It is understood that the illustrative examples discussed herein are exemplary in nature and that host vehicles, models, and kinematic parameters can be implemented.

At block 602, the method includes receiving proximate vehicle data associated with proximate vehicles. As discussed above, the proximate vehicle data includes vehicle identifiers and current kinematic data.

At block 702, the method includes identifying a potential lane change location 508. The potential lane change location 508 may be identified based on the proximate vehicles and/or downstream effects experienced by the host vehicle. For example, potential lane change location 508 may be based on the spacing between the following vehicle 510 and the first preceding vehicle 512. In another example, the downstream effects may be the host vehicle has been forced to slow down in response to downstream traffic or proximate vehicle moving at a slower velocity downstream.

At block 704, the method includes identifying a set of proximate vehicles of the proximate vehicles that can affect the potential lane change location. In some embodiments, the proximate vehicle sensors 138 may detect more proximate vehicles than are needed to determine whether the first gap 516 will be available at the future time. Accordingly, a set of proximate vehicles may be identified as the vehicles that are adjacent the identified potential lane change location 508 or adjacent a proximate vehicle that is adjacent the potential lane change location 508.

Alternatively, the proximate vehicles may be identified as member of pairs relative to the potential lane change location 508. For example, in one embodiment, pairs of proximate vehicles may include: (1) the following vehicle 208 and the first preceding vehicle 210, (2) the first preceding vehicle 210 and the second preceding vehicle 212, (3) the lane changing vehicle 206 and the first inline vehicle 214, and/or (4) the first inline vehicle 214 and the second inline vehicle 216. If a proximate vehicle is identified as a member of at least one of the pairs, the proximate vehicle is identified as a member of the set of proximate vehicles.

At block 706, the method includes comparing the proximate vehicle data of proximate vehicles in the set of proximate vehicles to a prediction model to calculate a predictive increment of kinematic data. Accordingly, kinematic data is calculated for each proximate vehicle in the set of the set of proximate vehicles.

At block 708, the method includes determining the predictive increment of kinematic data corresponds to a future time. If it is determined that the predictive increment of kinematic data does not correspond to a future time, the method continues to block 710.

At block 710, the method includes calculating addition kinematic data for a next predictive increment for each proximate vehicle in the set of the set of proximate vehicles. The additional kinematic data is based on the previous kinematic data. The method then returns to block 708 to determine if the next predictive increment corresponds to the future time. In this manner, the method iteratively calculates kinematic data until the predictive increment corresponds to the future time.

When it is determined, at block 708, that the predictive increment does correspond to the future time, the method continues to block 712. At block 712 the method includes identifying the additional predictive increment of kinematic data as future kinematic data.

From block 712, the method continues to block 606. At block 606 the method includes determining whether a gap will be available at the potential lane change location at the future time based on the future kinematic data, as described above with respect to FIG. 6.

Figure 8:
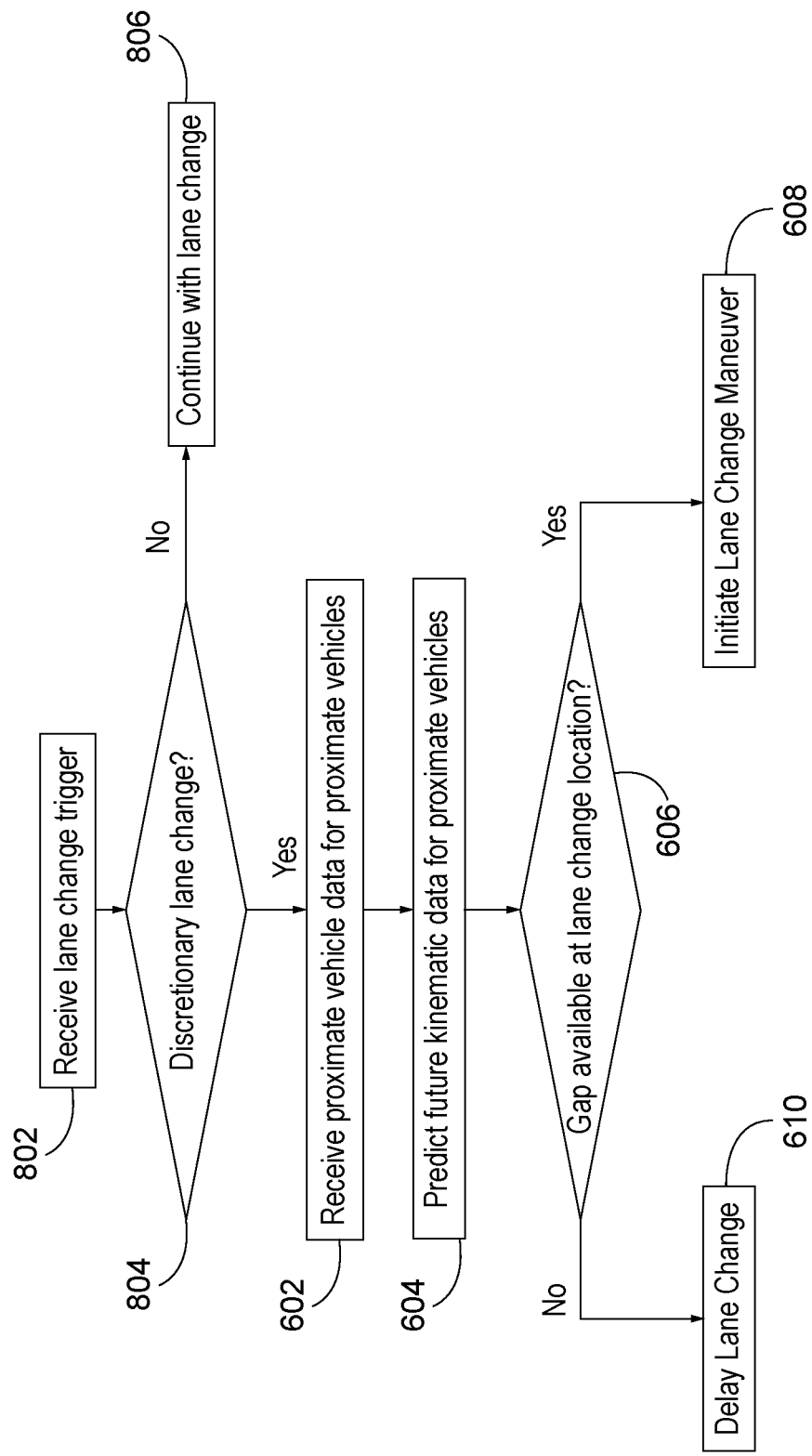
FIG. 8 is a process flow diagram of a method for anticipatory lane change including discretionary lane change determination according to an exemplary embodiment.

FIG. 8 is a process flow diagram of a method for anticipatory lane change including determining whether a lane change is discretionary according to an exemplary embodiment. FIG. 8 has blocks 602-610 that are similar to those discussed with respect to FIG. 6 above and are described with respect to FIG. 5. The blocks 602-610 of FIG. 8 operate in a similar manner as those described above to FIG. 6. It is understood that the illustrative examples discussed herein are exemplary in nature and that host vehicles, models, and values of kinematic data can be implemented.

At block 802, the method includes receiving a lane change trigger. The lane change trigger may be dependent on the nature of the host vehicle. For example, suppose in a first embodiment that the lane changing vehicle 506 is the host vehicle. The lane change trigger may be activation of the turn signal. Alternatively, the vehicle systems 122 may provide a lane change trigger based on downstream effects measured by the host vehicle sensors 136 (e.g., the host vehicle has been forced to slow down in response to downstream traffic) or measured by the proximate vehicle sensors 138 (e.g., the host vehicle senses proximate vehicle moving at a slower velocity downstream). Suppose in a second embodiment that the host vehicle is the following vehicle 510, the lane change trigger may be the lane changing vehicle 506 having lane changing distance 524 less than a threshold lane changing distance or proximity of the lane changing vehicle 506 to the lane markings.

At block 804, the method includes determining if the lane change is discretionary. The lane change being discretionary may be based on the roadway. For example, if the lane changing vehicle 506 is attempting to merge from an on-ramp or to an off-ramp that lane change would be considered a forced lane change since the merging lane ends or the lane changing vehicle 506 is attempting to exit the highway. Likewise, an obstacle in a lane may force a lane changing vehicle 506 to change lanes if there is no passable way for the lane changing vehicle 506 to remain in the first lane 502. In this manner, determining whether the lane change is discretionary is determined based on roadway characteristics.

Additionally, determining whether the lane change is discretionary may be determined based on host vehicle characteristics. For example, the host vehicle sensors 136 may recognize an issue (e.g., low tire pressure, high engine temperature, low fuel) that necessitate the vehicle moving off the roadway. Thus, changing lanes to move off the roadway in response to a host vehicle issue may be determined to be a forced lane change.

If it is determined that the lane change is not discretionary, in other word the lane changing is forced, the method continues to block 806. At block 806, the method includes continuing with the lane change. However, if it is determined that the lane change is discretionary, the method continues to block 602-610 described above with respect to FIG. 6.

The systems and methods described facilitate lane changing. For example, an anticipatory lane change system identifies proximate vehicle and the kinematic data of those vehicles, and is thus able to model the manner in which upstream vehicles (e.g., the following vehicle 510) and downstream vehicles (e.g., the first preceding vehicle 210, the second preceding vehicle 212, the first inline vehicle 214, the second inline vehicle 216) affect a potential lane change location 508. In particular, by predicting the future kinematic data of the proximate vehicles, including the spacing of those vehicles, the anticipatory lane change system can determine whether the first gap 516 will be available at the potential lane change location 508 at a future time for the lane changing vehicle 506. Accordingly, the anticipatory lane change system accounts for the traffic perturbations propagating from downstream and upstream proximate vehicles.

It will be appreciated that various of the above-disclosed and other features and functions, or alternatives or variants thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An anticipatory lane change system for assisting a host vehicle positioned in a current lane that is changing to a first gap in an adjacent lane, the anticipatory lane change system comprising:
a non-transitory memory storing instructions that are executed by a processor and cause the processor to:
identify a potential lane change location and receive proximate vehicle data associated with proximate vehicles, wherein the proximate vehicle data includes proximate vehicle identifiers and proximate vehicle current kinematic data;
predict future kinematic data for a future time for a set of proximate vehicles of the proximate vehicles, wherein the future kinematic data describes a pair of proximate vehicles including a first preceding vehicle and a second preceding vehicle, of the set of proximate vehicles, and a second gap separating the first preceding vehicle and the second preceding vehicle, wherein the first preceding vehicle is positioned between the second preceding vehicle and the host vehicle in a longitudinal direction, and wherein the future kinematic data is based on iteratively comparing the proximate vehicle current kinematic data to a prediction model of a set of prediction models;
determine whether the first gap will be available at the potential lane change location at the future time based on the future kinematic data, wherein the first gap is located between the first preceding vehicle and the host vehicle in the longitudinal direction; and
initiate a lane change maneuver for the host vehicle in response to determining that the first gap will be available at the potential lane change location at the future time.

2. The anticipatory lane change system of claim 1, wherein the proximate vehicle data for the second preceding vehicle is received from a vehicle-to-vehicle network and the proximate vehicle data for the first preceding vehicle is received from proximate vehicle sensors of the host vehicle.

3. The anticipatory lane change system of claim 1, wherein a particular vehicle identifier, of the vehicle identifiers, associates at least a portion of current kinematic data with a particular proximate vehicle of the proximate vehicles.

4. The anticipatory lane change system of claim 1, wherein the current kinematic data includes position data, velocity data, and acceleration data for the first preceding vehicle and the second preceding vehicle.

5. The anticipatory lane change system of claim 1, wherein the iterative comparison of the proximate vehicle current kinematic data to the prediction model includes instructions that are executed by the processor to cause the processor to:
compare the proximate vehicle data of the proximate vehicles in the set of proximate vehicles to the prediction model, and based on a result of comparison, calculate kinematic data for a predictive increment;
determine whether the predictive increment corresponds to the future time; and
in response to determining the predictive increment does not correspond to the future time, comparing the calculated kinematic data to the prediction model to calculate additional kinematic data at a next predictive increment.

6. The anticipatory lane change system of claim 5, wherein the future time corresponds to a plurality of seconds, and each predictive increment corresponds to a particular time step.

7. The anticipatory lane change system of claim 5, wherein the prediction model is a lookup table based on naturalistic behavior data.

8. The anticipatory lane change system of claim 5, wherein in response to determining the predictive increment of kinematic data does correspond to the future time, the instructions that are executed by the processor cause the processor to use the additional kinematic data as the future kinematic data.

9. The anticipatory lane change system of claim 1, wherein the instructions that are executed by the processor cause the processor to determine if the first gap will be available based on a predicted gap length of the first gap at the future time.

10. The anticipatory lane change system of claim 1, wherein the instructions that are executed by the processor cause the processor to initiate the lane change maneuver with an advanced driver-assistance system.

11. The anticipatory lane change system of claim 1, wherein in response to determining that the first gap will not be available at the future time, identify an updated potential lane change location.

12. An anticipatory lane change system for assisting a host vehicle positioned in a current lane that is adjacent to a first gap in an adjacent lane, the anticipatory lane change system comprising:
a non-transitory memory storing instructions that are executed by a processor and cause the processor to:
identify a potential lane change location and receive proximate vehicle data associated with proximate vehicles, wherein the proximate vehicle data includes proximate vehicle identifiers and proximate vehicle current kinematic data;
generate future kinematic data by iteratively calculating kinematic data for a set of proximate vehicles, including a first preceding vehicle, a second preceding vehicle, and a second gap separating the first preceding vehicle and the second preceding vehicle, in the adjacent lane, at predictive increments until the predictive increment corresponds to a future time, wherein the first preceding vehicle is positioned between the second preceding vehicle and the host vehicle in a longitudinal direction, wherein the future kinematic data for a proximate vehicle of the set of proximate vehicles is based on iteratively comparing the proximate vehicle current kinematic data to a prediction model of a set of prediction models;
determine whether the first gap will be available at the potential lane change location at the future time based on the future kinematic data, wherein the first gap is located between the first preceding vehicle and the host vehicle in the longitudinal direction; and initiate a lane change maneuver for the host vehicle in response to determining that the first gap will be available at the potential lane change location at the future time.

13. The anticipatory lane change system of claim 12, wherein the current kinematic data includes position data, velocity data, and acceleration data for the first preceding vehicle and the second preceding vehicle.

14. The anticipatory lane change system of claim 12, wherein the future time corresponds to a plurality of seconds, and each predictive increment corresponds to a second.

15. The anticipatory lane change system of claim 12, wherein the instructions that are executed by the processor cause the processor to determine if the first gap will be available based on a predicted gap length of the first gap at the future time.

16. The anticipatory lane change system of claim 12, wherein the proximate vehicle data for the second preceding vehicle is received from a vehicle-to-vehicle network and the proximate vehicle data for the first preceding vehicle is received from proximate vehicle sensors of the host vehicle.

17. An anticipatory lane change method for assisting a host vehicle positioned in a current lane that is changing to a first qap in a lane that is adjacent to the current lane, the anticipatory lane change method comprising:

identifying a potential lane change location;

receiving proximate vehicle data associated with proximate vehicles and a second gap separating at least two proximate vehicles, wherein the proximate vehicle data includes proximate vehicle identifiers, proximate vehicle current kinematic data, and a second gap length of the second gap;

identifying a set of proximate vehicles of the proximate vehicles including the at least two proximate vehicles;

comparing the proximate vehicle data in the set of proximate vehicles to a prediction model to calculate a predictive increment of kinematic data;

determining the predictive increment of kinematic data does not correspond to a future time;

comparing the predictive increment of kinematic data to the prediction model, and based on a result of comparison, calculate an additional predictive increment of kinematic data;

identifying the additional predictive increment of kinematic data as future kinematic data when the additional predictive increment of kinematic data corresponds to the prediction model for the future time;

determining whether the first gap will be available at the potential lane change location at the future time based on the future kinematic data; and initiating a lane change maneuver for the host vehicle in response to determining that the first gap will be available at the potential lane change location at the future time.

18. The anticipatory lane change method claim 17, wherein the future time corresponds to a plurality of seconds, and each predictive increment corresponds to a second.

19. The anticipatory lane change method of claim 17, wherein the proximate vehicle data for a first proximate vehicle of the set of proximate vehicles is received from a vehicle-to-vehicle network and the proximate vehicle data for a second proximate vehicle of the set of proximate vehicles is received from proximate vehicle sensors of the host vehicle.

20. The anticipatory lane change method of claim 17, wherein determining if the first gap will be available is based on a predicted gap length of the first gap at the future time.

* * * * *